I. Crum,
Harrow.
No. 91,525.
Patented June 22, 1869.
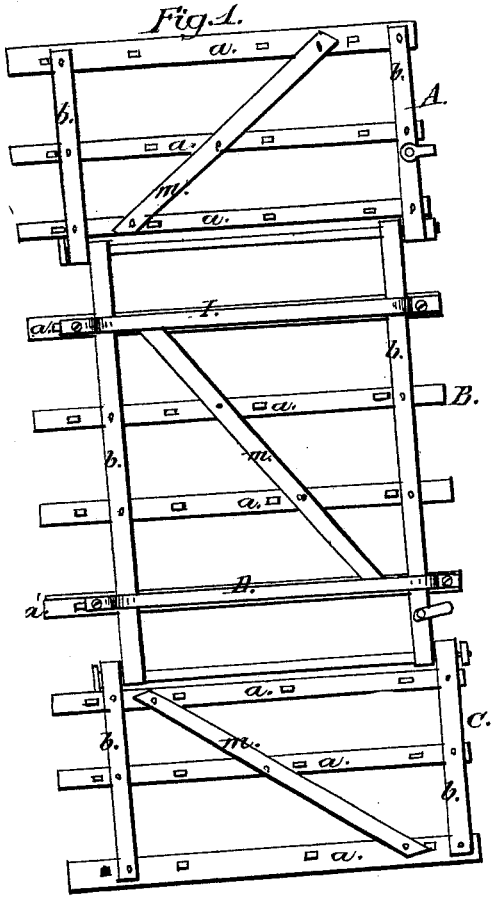
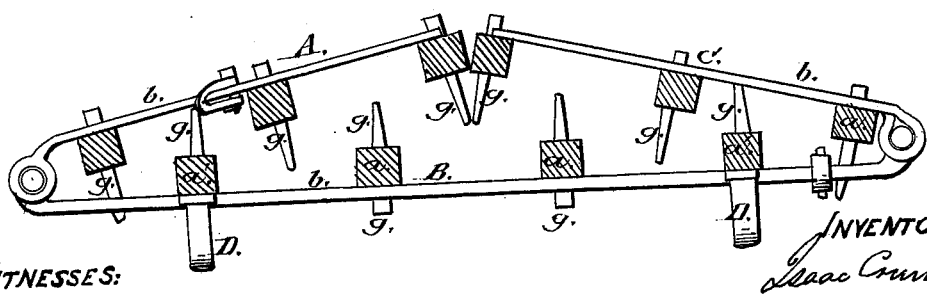
WITNESSES:
E. S. Peck
H. H. Peck
INVENTOR:
Isaac Crum.
per H. R. K. Peck.
attorney.

United States Patent Office.

ISAAC CRUM, OF WEST CHESTER, OHIO.

Letters Patent No. 91,525, dated June 22, 1869; antedated June 8, 1869.

IMPROVEMENT IN HARROWS.

The Schedule referred to in these Letters Patent and making part of the same.

*To all whom it may concern:*

Be it known that I, ISAAC CRUM, of West Chester, in Butler county, in the State of Ohio, have invented certain new and useful Improvements in Harrows; and I do hereby declare that the following is a full and exact description thereof, reference being had to the accompanying drawings, and to the letters of reference marked thereon.

Figure 1 represents a top or plan view of my improved harrow, when opened for use.

Figure 2 represents the same, when folded together for transportation from place to place, it being a transverse sectional view.

My invention consists in certain improvements on the harrow for which I obtained Letters Patent dated March 24, 1868, my object being to cheapen and simplify the construction of the sectional hinged harrow, which may be transported upon fixed runners attached to the upper side of the structure, as hereinafter fully described.

In the accompanying drawings—

A B C denote the three sections of the harrow, the rails $a$ of which are secured with bolts to the iron bars $b$, to which the hinges are connected.

D D denote the runners, which are formed of bent bars of iron, which are bolted at each end to the rails of the harrow $a'$.

The hinges are so formed and arranged as to permit the sections A and C to be folded inward after the harrow is turned over to rest upon its runners D.

Harrows of various constructions may be provided with the skeleton runners D, upon which the harrow may be conveyed from one field to another.

When it is desired to transport the harrow, the attendant will first reverse its position, and then fold the two outer sections A C inward and over the central section B.

Harrows of smaller dimensions may be made with but two sections, to be folded in like manner.

The two outer rails of the side sections may be made wider and heavier than the others, which will cause the wings A and C to hug the ground more closely when the harrow is in use.

When the harrow is so made that the two wings or sections A C will, when folded, come in contact, the points of the teeth will all be enclosed within the three sections of the harrow, and consequently there will be no danger of accidents resulting from carelessness, which might occur by the attendant falling upon the exposed teeth.

The runners D are of iron, and secured by bolts to the two outer rails $a'$ of the central section B of the harrow.

The hinges are formed by loops in the ends of the bars $b$, through which the rods R are inserted.

The teeth $g$ are inserted through the rails $a$ $a$ $a'$, and when the harrow is folded, as represented in fig. 2, the points of the teeth will be enclosed within the three sections A B C, and the harrow may be drawn upon the ground upon its runners D D, in its inverted and folded condition.

The braces $m$ are bolted, to secure the rails $a$ $a'$ in their proper fixed relations.

Having fully described my improved harrow,

What I claim, and desire to secure by Letters Patent, is—

The arrangement of the sections A B C, for transportation from place to place, by reversing the position of the harrow upon the ground, and folding the sections in the manner described.

In testimony whereof, I have hereunto set my hand, this 5th day of May, 1868.

ISAAC CRUM.

Witnesses:
H. P. K. PECK,
S. E. PECK.